United States Patent Office 3,367,394
Patented Feb. 6, 1968

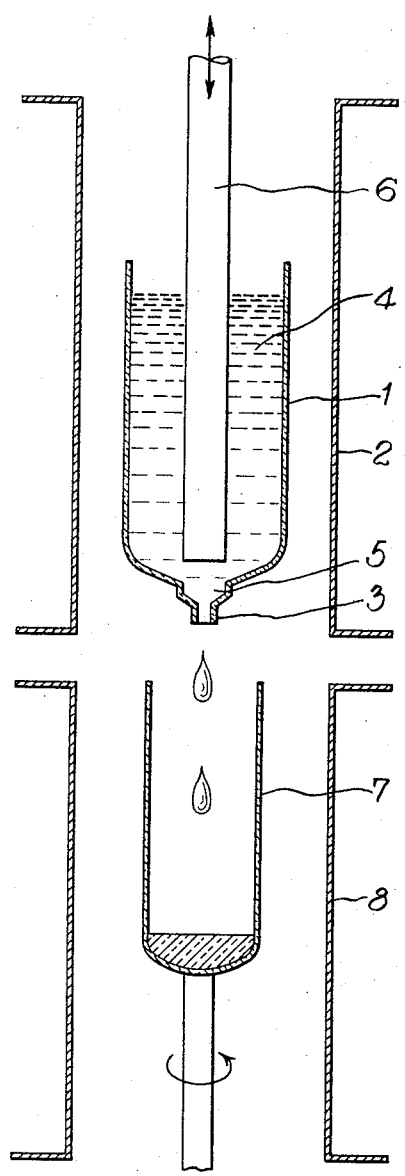
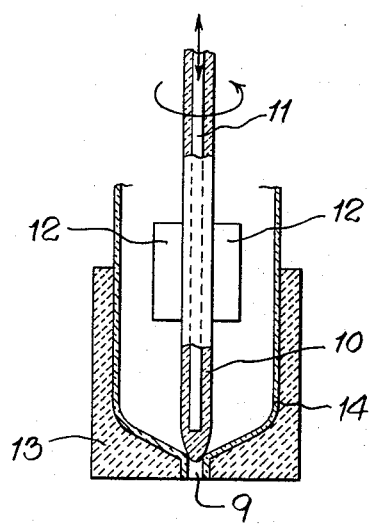

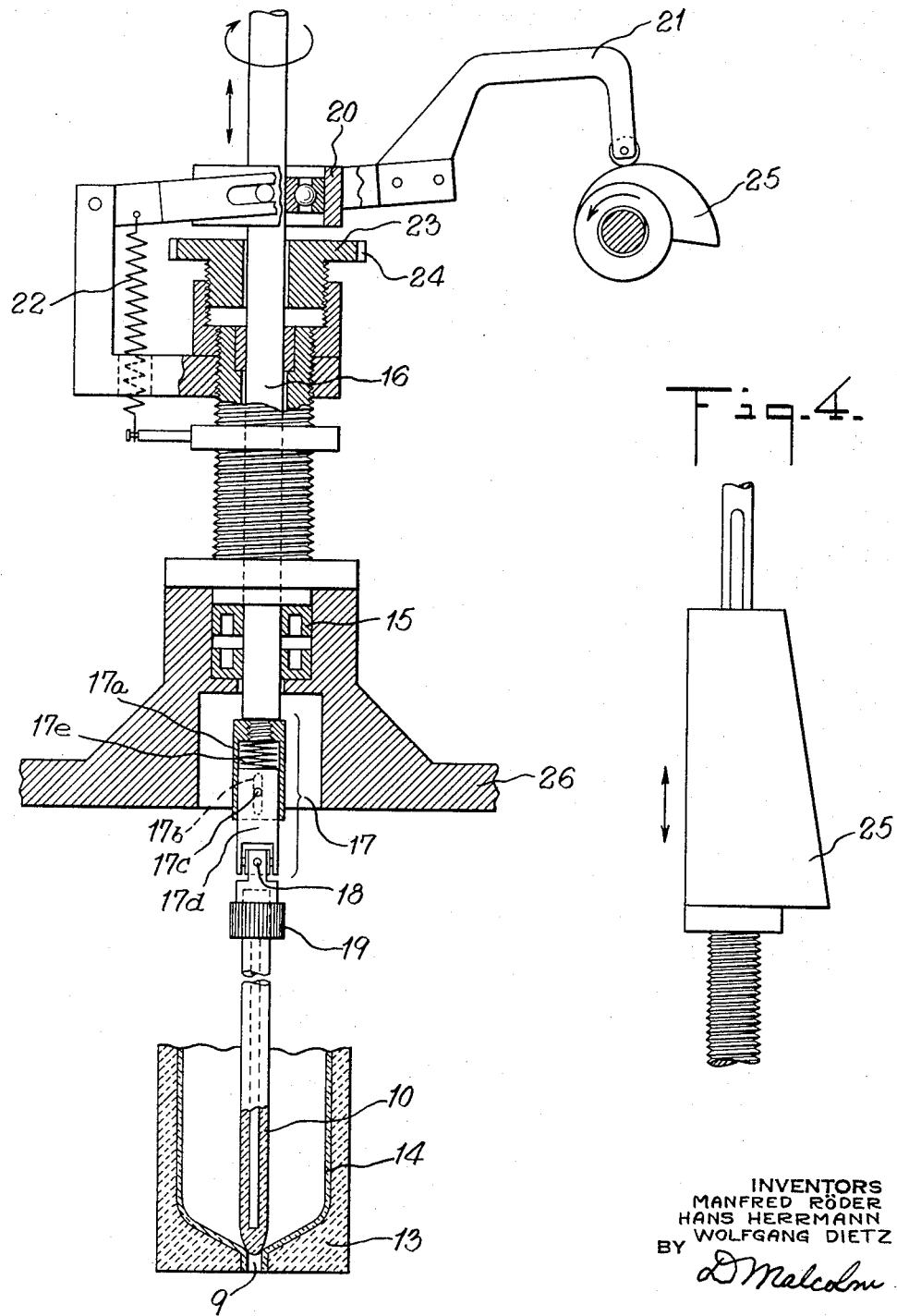

3,367,394
**PROCESS FOR MANUFACTURING HOMOGENE-
OUS BODIES OF GERMANIUM-SILICON**
Manfred Röder, Hans Herrmann, and Wolfgang Dietz,
Munich, Bavaria, Germany, assignors to Consortium
fur Elektrochemische Industrie G.m.b.H., Munich,
Bavaria, Germany, a corporation of Germany
Filed Nov. 12, 1965, Ser. No. 507,467
Claims priority, application Germany, Nov. 12, 1964,
C 34,347
5 Claims. (Cl. 164—46)

This invention relates to manufacturing homogeneous germanium-silicon bodies, and it has for its object to provide a novel and improved process for this purpose.

Another object of the invention is to simplify and expedite the production of homogeneous germanium-silicon bodies by preparing a homogeneous melt of these elements and then forming crystalline bodies of desired shape and size directly from said melt.

Still another object is to obtain higher homogeneous concentrations of doping materials in germanium-silicon bodies by the spatial separation of the homogeneous melt and the crystallization zone.

Various other objects and advantages will be apparent as the nature of the invention is more fully disclosed.

It is known that germanium and silicon form a continuous series of mixed crystals. Both elements crystallize in the diamond type and their frame constants differ by about 4%. The mixed crystal system germanium-silicon, particularly in doped condition, recently attained special importance as a thermal generator for generating electrical energy.

For manufacturing rods of germanium-silicon from the melt several processes are known, and all of these involve a distribution of components between the liquid and the solid phase, generally applicable to mixed crystals and depending on the distribution coefficient, which must be taken into account in the manufacturing processes. Manufacturing according to the so-called zone alloy process is very popular. One starts with a vessel containing germanium and silicon rods of suitable sizes arranged side by side and causes the melting zone to move from one end to the other. In order to obtain homogeneous germanium-silicon rods by this process very long melting and crystallizating periods are necessary, and one cannot prevent the rod ends from being non-homogeneous.

In a crucible-free working method one mixes a powder of the desired concentration of germanium and silicon, and then blows the mixture into a vertically hanging liquid cone of a germanium-silicon rod and melts it. In this case the crystallization takes place when one turns the rod around its own axis and withdraws it slowly from the heating zone.

The drawback of this process is that the material can be used only in powder form, and only granules with diameters of 0.01 to 0.15 mm. can be used. Moreover, it is not a simple matter to regulate the powder feeding, and rods with less than 50 atom percent silicon cannot be manufactured because the liquid drop becomes too rich with heavy germanium and therefore it breaks.

We have now discovered a process for manufacturing homogeneous, if necessary p- or n- conducting bodies of germanium-silicon, in which the faults that occur with the customary melting processes have been eliminated. The process is characterized by the fact that a homogeneous melt of germanium-silicon, which may also contain a doping material, is removed drop by drop from the melting vessel and is caused to crysallize in a shaping container underneath, where the heat is regulated in the solidification zone by the heat content of the melt which is introduced drop by drop. It has been found that it is useful when the crystallization occurs by drop or in a thin film.

A particular advantage of the process of our invention lies in the fact that by giving the shaping container the appropriate shape, the formed bodies are obtained right away in the shape and with the dimensions necessary for the elements to be constructed.

With this process it is possible, besides manufacturing homogeneous bodies, to build in higher concentrations of doping substances distributed homogeneously throughout the body. This is necessary, for instance, when germanium-silicon is used as a thermoelement. In the customary melting processes, particularly in the n-conductive system, it is difficult to obtain the necessary high concentrations of doping substances. By the spatial separation of the melt supply and the solidification zone it is simple to obtain the desired degree of doping either with solid or gaseous doping materials.

A further advantage of our method of operation is the manufacture of semiconductor bodies in a comparatively shorter time than heretofore. For example, the dripping off and the crystallization of the melt can be so regulated that the solidifying zone can take place at a speed of about 300 mm./h. whereas with zone-alloying speeds of about 10 mm./h. cannot be exceeded.

The invention is described in connection with the accompanying drawings, in which:

FIG. 1 is a diagrammatic sectional view of an apparatus for carrying out the process of the invention;

FIG. 2 is a diagrammatic sectional view illustrating a modification of the melting vessel which constitutes the upper part of FIG. 1;

FIG. 3 is a diagrammatic sectional view of an automatic apparatus for carrying out the process of the invention; and FIG. 4 is a top plan view of the conical lifting cam shown in FIG. 3.

In FIG. 1 the melting vessel 1 made of quartz is located in the furnace 2 and at its bottom it has an aperture with the depending capillary 3. Also it has an additional chamber 5 on the bottom which is separated from the melt supply by a fitted plug or plunger 6 which, for instance, can be a quartz rod. By pressing the plug 6 down through the melt supply volume 4 until it hits the bottom of chamber 5, the melt is squeezed off through the aperture and the capillary 3 drop by drop, depending on the volume of the chamber 5. This arrangement has the advantage that the up-and-down movement of the plug 6 can easily be mechanized. Moreover, the plug 6 can also be shaped as a stirrer, so that the conditions for a homogeneous starting melt are fulfilled in any case.

As a catching and shaping vessel we use, for instance, a quartz crucible 7 in furnace 8, and this crucible is movable, for instance it can be rotated or vibrated in order to improve the attainable homogeneity of the body to be shaped and for better distribution of the melt volume which will solidify in part during the test. Furthermore a treatment with supersonants has proven to be very advantageous.

By additional heating or cooling of the shaping vessel the conditions of solidification and thereby the attainable material qualities can be varied widely.

The entire setup can in addition be housed in a boiler and, depending on the requirements, it can be operated under a protective gas or in a high vacuum. In combination with a precombustion chamber for the manufacture of the melt a continuous operation is also possible.

Another shape of the melting vessel is shown in FIG. 2, the bottom of this vessel 14 having a conical shape. There is no special measuring chamber above aperture 9. The quartz plug or plunger 10 is reinforced by a metal rod 11 and is tapered at its lower end as illustrated. It has attachments or paddles 12 which improve the stirring effect when plug 10 rotates. The vessel 14 is supported by graphite jacket 13 when the melt is dripping off.

Example 1

21.6 g. germanium (degree of purity 99.999%), 19.6 g. silicon (degree of purity 99.999%) and 0.024 g. armorphous boron powder (degree of purity 99.99%) are weighed into the melting vessel 1 of about 25 mm. diameter and with a capillary aperture 3 of about 1.0–1.5 mm. in order to obtain a p-conductive rod with a composition of 30 atom percent germanium and 70 atom percent silicon. The melting vessel 1 as well as the shape-giving quartz crucible 7 here shaped like a tube are built into a boiler, so that one can work in a high vacuum.

In order to obtain a homogeneous melt, the melt is stirred, after melting, for about 15–30 minutes, vigorously, with the plug 6, and then it is allowed to drip off at a speed of 1 drop/second. The catch vessel 7, which is a quartz crucible with an inside diameter of about 12 mm. and about 120 mm. long, is rotated at a speed of about 60 r.p.m. during the dripping off. We obtain a completely homogeneous p-conductive rod with the following thermoelectrical constants at room temperature:

Thermal energy $\alpha$ (microvolt/° C.) _____ +115
Electrical conductivity $\sigma$ (ohm cm.)$^{-1}$ _____ 850
Thermal conductivity $\lambda$ .$10^2$ (watts/cm. ° C.) ___ 5.0

Furthermore, the homogeneity is checked by X-ray.

Example 2

Into the melting vessel 1 with dimensions as per Example 1, the same quantities and qualities of germanium and silicon are weighed as described in Example 1. In order to obtain an n-conductive rod the melt must be supplied, for instance, with an element from the 5th main group of the Periodic System. When using phosphorus as the doping material, the entire setup is operated under protective gas and one works, for example, as follows:

Argon loaded with PCl$_3$ is piped into the melt through an additional quartz tube (not shown) that is installed and leads into the melting vessel 1. Before entering the melt, the stream of argon of 10 l/h. is put through a saturator which is kept at 40° C. together with PCl$_3$ and for 30 minutes it is bubbled through the melt. At the beginning of the drip-off phase the gas stream is regulated in such a way that the loss of phosphorus which occurs due to evaporation is compensated, i.e. the concentration of phosphorus in the melt is kept constant, which can be achieved with a streaming velocity of the argon at 5 l/h.

When using arsenic as the doping material one can proceed analogously with argon containing AsCl$_3$, while antimony, bismuth or other doping materials are added directly to the melt or the starter material.

The drip-off process occurs as described in Example 1. A rod which was made in the described manner from a phosphorus-doped melt is completely homogeneous and it has the following thermoelectrical constants at room temperature:

Thermal energy $\alpha$ ($\omega$ v./° C.) _____ −125
Electrical conductivity $\sigma$ (ohm cm.)$^{-1}$ _____ 900
Thermal conductivity $\lambda$ .$10^2$ (w./cm. ° C.) _____ 5.0

Example 3

A melt as described in Example 1 or 2 is dripped at a speed of 2 drops per second into a container with inside dimensions 8 x 8 x 8 mm. The shape giving container is made of quartz and is located on a metal plate that can be rotated, or on a metal conveyor belt, by means of which the quartz shapes can be taken into the drop region of the melt and carried on after the filling is completed. During the entire duration of the drip-off and solidification process the shape is kept vibrating. One obtains cubes of germanium-silicon which can be used as structural elements.

Example 4

In FIG. 3 a melting vessel 14 (like that in FIG. 2) of quartz and surrounded by a graphite jacket 13, with an inner diameter of 25 mm. and a lower opening 9 about 2–2.5 mm. is contained in a chamber which can be evacuated and of which only the upper part 26 is shown in FIG. 3. This shows a sealed lead-in 15 of well-known type for the driving rod 16. A clamping device 19 for the quartz rod or plunger 10 is coupled to the driving rod 16 by a flexible intermediate member 17 and a universal joint 18. Outside the chamber the apparatus for the movement of the rod or plunger are arranged. The rotating driving rod 16 positioned in a ring-shaped connecting member 20, together with said member 20, can be lifted periodically against the tension of spring 22 through a lever arm 21 which clamps the driving rod in a bifurcated or fork-like manner. The driving rod is moved back by spring 22 in its lower position of rest. The downward movement is limited by the adjustable stop 23. Adjustment is made by screwing up or down, and can also be done by a motor the gears of which mesh in the outer gear rim of the stop 23, as indicated at 24. FIG. 4 shows the conical lifting cam 25 of FIG. 3 in top plan view. By axial movement of cam 25 the piston-like movement of the driving rod can be increased or decreased during operation.

The above-mentioned flexible connecting member 17, by which the driving rod 16 leading out of the evacuating chamber is connected to the rod or plunger 10, consists specifically of a guiding part 17a screwed to the lower end of driving rod 16 in which part 17d can be freely moved. The transmission of the rotary motion occurs through slots 17b and pins 17c. Part 17d is supported by a spring 17e opposite the guiding part 17a. The tension of this spring can be regulated in the closed position of the plunger 10 by adjusting the stop 23 higher or lower whereby a lower setting of the stop increases the spring tension and vice versa.

For the production of a n-conducting rod there is in the smelting container a mixture of 25 atomic percent germanium and 75 atomic percent silicon in the form of powder or granules, both components having a purity degree of 99.999 weight percent. This mixture is smelted in an atmosphere of purest argon under normal pressure. For this purpose the melting vessel with its graphite jacket 13 is surrounded by an induction or resistance heating arrangement of the usual type, the temperature of which is about 1350° C. During the heating up, the plunger is kept in a vibrating movement; after the melting of the mixture it is stirred for approximately 15 minutes with about 60 revolutions per minute to achieve homogeneity.

Through a filling nozzle in the wall of the evacuating chamber 26 one adds, after the homogenizing of the melt, 0.5 weight percent, in respect of the total quantity of germanium and silicon, phosphorus (degree of purity 99.99 weight percent) in a mixture of germanium-silicon powder of the above-named composition or in the form of an alloy to the melt. The phosphorus is stirred into the melt for 3 to 5 minutes, the total quantity amounting to 60 g.

Before the beginning of the dripping the temperature of the heating apparatus is raised to approximately 1450° C.; the pressure inside the chamber is reduced to about 100 torr. Then begins the emptying of the melting vessel into the collecting vessel which rotates and can be adjusted as to height. One starts off with a frequency of the plunger stroke of 1/sec. and progresses to 1 stroke in 4 seconds after dripping has set in. The rotating movement of plunger 10 is thereby maintained. Through gradual lowering of the collecting vessel (such as 7 in FIG. 1) during the dripping of the melt the result is that the drop height remains constant throughout. The collecting vessel is also constructed of quartz. It is of cylindrical shape, has an inner diameter of 12 mm. and a length of 150 mm. By annealing a silicon coating at 1000° C. in the air it has been provided with a separating layer. With increasing emptying of the melting vessel one regulates the tension of spring 17e by lowering the stop 23 in the above-described manner and increases the piston stroke by moving cam 25 lengthwise of its axis. The most favorable values for those two variables which influence the size of the drops and thus the process of crystallization, and their change during the dripping of the smelting mixture have been ascertained by preliminary tests (dripping of equal amounts of melted material into containers of the above-mentioned form and size) in such a way that the crystallization zone of the rod being formed proceeds evenly with about 300 mm./h. The dripping of the melt is finished in about 30 minutes.

The manufactured rod of 12 mm. diameter and about 150 mm. length has the following characteristics, at 20° C.:

Thermal energy $\alpha$ ($\omega$V/° C.) _____ −125
Electrical conductivity $\sigma$ (ohm cm.)$^{-1}$ _____ 900
Thermal conductivity $\lambda.10^2$ (w./cm.° C.) _____ 5.0

It is free of cracks and pores and sufficiently homogeneous over its entire dimension in order, for instance, to be used for thermo-elements.

The invention claimed is:

1. Process for manufacturing homogeneous bodies of germanium-silicon which comprises forming a homogenous melt of germanium-silicon in a melting zone, discharging the melted material drop by drop from said melting zone into a shaping device and solidifying the material in crystalline form in said device, the temperature in the solidification zone being regulated by the heat content of the melted material which is introduced therein drop by drop.

2. Process according to claim 1, characterized by the fact that the crystallization takes place in thin layer.

3. Process according to claim 2, characterized by the fact that the drops are discharged from said melting zone into said shaping device by means of a moving plug.

4. Process according to claim 1, characterized by the fact that said shaping device is moved during crystallization of the molten drops.

5. Process according to claim 1, characterized by the fact that the melt of germanium-silicon in said melting zone contains a doping material and that it is intimately mixed before being discharged from said melting zone.

No references cited.

J. SPENCER OVERHOLSER, *Primary Examiner.*

V. K. RISING, *Assistant Examiner.*